(12) United States Patent
Gagas et al.

(10) Patent No.: US 11,787,384 B2
(45) Date of Patent: Oct. 17, 2023

(54) ELECTRIC DRIVE SYSTEM AND METHOD

(71) Applicant: GM GLOBAL TECHNOLOGY OPERATIONS LLC, Detroit, MI (US)

(72) Inventors: Brent S. Gagas, Pleasant Ridge, MI (US); Kerrie M. Spaven, Rochester Hills, MI (US); Brian A. Welchko, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 52 days.

(21) Appl. No.: 17/532,258

(22) Filed: Nov. 22, 2021

(65) Prior Publication Data
US 2023/0159014 A1 May 25, 2023

(51) Int. Cl.
*B60W 10/08* (2006.01)
*B60W 10/26* (2006.01)

(52) U.S. Cl.
CPC ............ *B60W 10/08* (2013.01); *B60W 10/26* (2013.01); *B60W 2510/244* (2013.01); *B60W 2710/081* (2013.01); *B60W 2710/083* (2013.01)

(58) Field of Classification Search
CPC .................. B60W 10/08; B60W 10/26; B60W 2510/244; B60W 2710/081; B60W 2710/083
USPC .......................................................... 701/22
See application file for complete search history.

(56) References Cited

U.S. PATENT DOCUMENTS

| | | | |
|---|---|---|---|
| 6,362,585 B1 * | 3/2002 | Hiti | B60L 15/04 318/434 |
| 2016/0311426 A1 * | 10/2016 | Sato | B60W 20/15 |
| 2017/0129494 A1 * | 5/2017 | Cho | B60K 6/48 |
| 2017/0257049 A1 * | 9/2017 | Jing | H02P 27/08 |
| 2021/0175832 A1 * | 6/2021 | Khan | H02P 27/08 |

* cited by examiner

*Primary Examiner* — Yi-Kai Wang
(74) *Attorney, Agent, or Firm* — Quinn IP Law

(57) ABSTRACT

An electric drive system, method and apparatus includes a rechargeable energy storage unit, a power inverter, and a rotary electric machine. Transfer of electrical power between the rechargeable energy storage unit and the rotary electric machine is governed by a pulse width modulation (PWM) switching frequency, which is one of a non-six-step switching mode or a six-step switching mode. Executable instructions determine a rotational speed, a torque command, a torque direction, a bus voltage, and a hysteresis band, determine a modulation index command in response to the rotational speed, the torque command, the torque direction, and the bus voltage, and command operation of the rotary electric machine in one of the non-six-step switching mode or the six-step switching mode employing the modulation index command.

20 Claims, 5 Drawing Sheets

ELECTRIC DRIVE SYSTEM AND METHOD

INTRODUCTION

The present disclosure relates generally to control of pulse-width modulated switching in an electric machine, such as may be employed in an electrified drivetrain for electric vehicles, extended-range electric vehicles, plug-in hybrid electric vehicles, fuel cell hybrid electric vehicles, etc. Many electric vehicles employ a rechargeable traction battery pack to store and supply electric power for operating one or more traction motors. Operation and control of each traction motor, which may be a polyphase alternating current (AC) motor generator unit, may be accomplished by employing a power inverter to transform direct current (DC) power to motor-driving AC power using pulse-width modulated (PWM) control signals outputted from a control unit in the electric vehicle. Motor windings of each polyphase AC motor generator unit may be coupled to inverter sub-modules of the power inverter, each of which employs a pair of switches that open and close in a complementary manner to perform a fast-switching function to convert DC power to AC power, and vice versa.

Control methods employed with power inverters, e.g., voltage source inverters, are susceptible to voltage distortion due to practical limitations of the power inverter, such as inverter lockout time, or dead time, and minimum pulse width constraints. The voltage distortion and other effects result in undesired noise, vibration and/or harshness (NVH) under certain operating conditions. The limitations of the power inverter may lead to imposing minimum and maximum pulse widths to minimize the undesired NVH effects. The non-linear effects produce unachievable regions that occur for each phase of the power inverter.

It is desirable to provide a system and method for minimizing inverter switching losses and NVH when operating a polyphase AC motor. It is desirable to have a control system that manages performance trade-offs between undesired vibration and motor efficiency and optimizing operation to minimize NVH, maximize efficiency, maximize torque output, and improve high-speed controllability, including selectively operating in one of a six-step mode or a non-six step mode.

SUMMARY

Disclosed herein is an electric drive system, method and/or apparatus that includes a rechargeable energy storage unit, a power inverter operatively connected to the rechargeable energy storage unit and a rotary electric machine operatively connected to the power inverter via an electric power bus. A controller is in communication with the power inverter. Transfer of electrical power between the rechargeable energy storage unit and the rotary electric machine is governed by a pulse width modulation (PWM) switching frequency, which is one of a non-six-step switching mode or a six-step switching mode. The controller has a processor and tangible, non-transitory memory on which instructions are recorded. The instructions are executable by the processor to determine a rotational speed, a torque command, a torque direction, a bus voltage, and a hysteresis band, determine a modulation index command in response to the rotational speed, the torque command, the torque direction, and the bus voltage, and command operation of the rotary electric machine in one of the non-six-step switching mode or the six-step switching mode employing the modulation index command.

An aspect of the disclosure includes the instructions being executable to determine a first calibration defining a first relation between the rotational speed, the torque command and the modulation index command, and determine a second calibration based upon the first calibration and the bus voltage. The modulation index command is determined for the rotational speed and the torque command employing the second calibration.

Another aspect of the disclosure includes the first calibration being a look-up table residing in the tangible, non-transitory memory and accessible to the controller.

Another aspect of the disclosure includes the second calibration being a virtual look-up table that is generated by the controller, and captured in a transitory memory device of the controller.

Another aspect of the disclosure includes the instructions being executable to transition the operation of the rotary electric machine to the other of the non-six-step switching mode or the six-step switching mode based upon the rotational speed, the torque command, the torque direction, the bus voltage, and the hysteresis band.

Another aspect of the disclosure includes the instructions being executable to command operation of the rotary electric machine in the other of the non-six-step switching mode or the six-step switching mode employing the modulation index command.

Another aspect of the disclosure includes the instructions being executable to determine a modulation index command that is responsive to the rotational speed and the torque command for the torque direction based upon the bus voltage and minimize factors related to vibrational harshness caused by rotation of the rotary electric machine.

Another aspect of the disclosure includes the instructions being executable to determine a modulation index command that is responsive to the rotational speed and the torque command for the torque direction based upon the bus voltage and maximizes efficiency.

Another aspect of the disclosure includes the instructions being executable to select a high value modulation index command during operation in the non-six-step switching mode and in a low torque region.

Another aspect of the disclosure includes the instructions being executable to select a mid-value modulation index command during operation in the non-six-step switching mode and in a mid-torque region.

Another aspect of the disclosure includes the instructions being executable to select a modulation index command greater than 100% during operation in the six-step switching mode.

Another aspect of the disclosure includes the torque direction being one of a motoring torque or a regenerative torque; wherein a first modulation index command determined the motoring torque differing from a second modulation index command determined for the regenerative torque.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality. The use of ordinals such as first, second and third does not necessarily imply a ranked sense of order, but rather may only distinguish between multiple instances of an act or structure.

Figure 1:
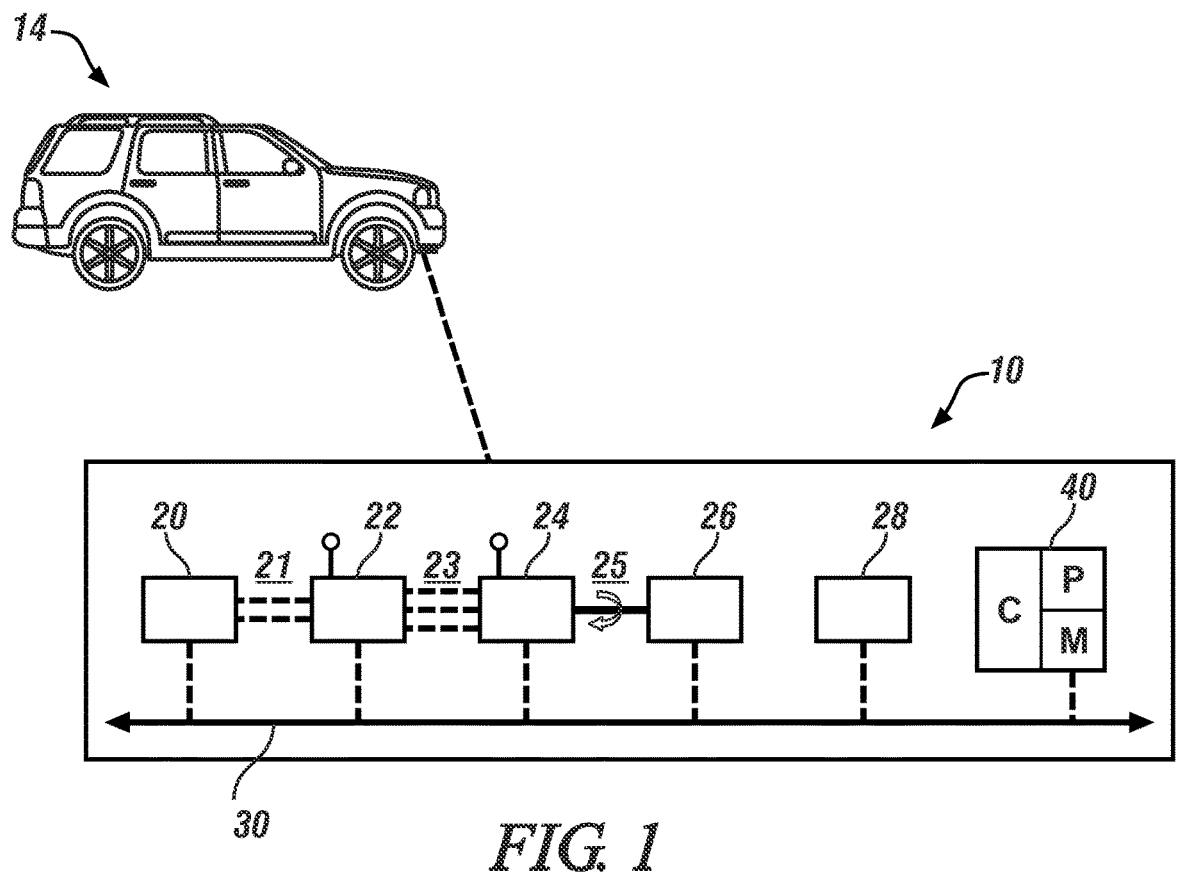
FIG. 1 schematically illustrates an electric drive system arranged to supply tractive torque to a vehicle, in accordance with the disclosure.

Referring to the drawings, wherein like reference numbers refer to like components, FIG. 1 schematically illustrates an electric drive system 10 arranged to supply tractive torque to a vehicle 14. Operation of the electric drive system 10 is controlled by a controller C 40. The electric drive system 10 may be an electric drive system or a hybrid drive system that employs a rotary electric machine. The vehicle 14 may include, but is not limited to, a passenger vehicle, sport utility vehicle, light truck, heavy duty vehicle, minivan, bus, transit vehicle, bicycle, moving robot, agricultural vehicle, sports-related equipment, boat, plane, or railtrain. Alternatively, the electric drive system 10 may be arranged to supply torque to a stationary system. It is to be understood that the electric drive system 10 may take many different forms and have additional components.

The electric drive system 10 includes a DC power source such as a rechargeable energy storage unit (battery) 20. The electric drive system 10 includes a power inverter 22 and a rotary electric machine 24. The rechargeable energy storage unit 20 is electrically connected to the power inverter 22 via a high-voltage DC power bus 21, and the power inverter 22 is connected to the rotary electric machine 24 via electrical conductors 23. The rotary electric machine 24 is mechanically coupled to a propulsion unit 26 via a rotatable member 25. The rechargeable energy storage unit 20 may be a traction battery pack for generating high-voltage power that may be directed to the propulsion unit 26, via the rotary electric machine 24, and for operating other electrical systems 28 in the vehicle 14. The rechargeable energy storage unit 20 may include battery cells of different chemistries. In one example, the power inverter 22 is a three-phase three-wire voltage-source inverter. In some embodiments, the power inverter 22 may be part of a power inverter module of the electric vehicle 14. In order to generate tractive power with sufficient vehicle range and speed, the rechargeable energy storage unit 20 in the electric vehicle 14 may be larger and higher in capacity than a nominal 12-volt starting, lighting, and ignition battery. In such an instance, the electric drive system 10 is a high-voltage electric drive system 10. Sensors and other monitoring elements (not shown) may be arranged to monitor electrical parameters (e.g., voltage, current) at various locations, and mechanical parameters (e.g., speed) at various other locations.

Referring again to FIG. 1, the rotary electric machine 24 electrically connects to the rechargeable energy storage unit 20 via the high-voltage DC power bus 21 and the power inverter 22. The power inverter 22 is configured with control circuits including power transistors, e.g., IGBTs for transforming high-voltage DC electric power to high-voltage AC electric power and transforming high-voltage AC electric power to high-voltage DC electric power. The power inverter 22 may employ pulsewidth-modulating (PWM) control of the IGBTs to convert stored DC electric power originating in the rechargeable energy storage unit 20 to AC electric power to drive the rotary electric machine 24 to generate torque. Similarly, the power inverter 22 converts mechanical power transferred to the rotary electric machine 24 to DC electric power to generate electric energy that is storable in the rechargeable energy storage unit 20, including as part of a regenerative braking control strategy. The power inverter 22 receives motor control commands and controls inverter states to provide the motor drive and regenerative braking functionality. In one embodiment, a DC/DC electric power converter electrically connects to the high-voltage DC power bus 21 to provide electric power to a low-voltage battery via a low-voltage bus. The low-voltage battery electrically connects to an auxiliary power system to provide low-voltage electric power to low-voltage systems on the vehicle, including, e.g., electric windows, HVAC fans, seats, and other devices. The controller 40 is operatively connected to the power inverter 22 to control transfer of electric power between the rechargeable energy storage unit 20 and a plurality of radially oriented electrically conductive windings of a stator of the rotary electric machine 24. The controller 40 controls the power inverter 22 to sequentially electrically activate electrically conductive windings to exert a rotating magnetic force on a rotor of the rotary electric machine 24 to effect rotation, or to react torque to retard rotation during regenerative operation.

Motors, generators, and other types of electric machines are often embodied as alternating current (AC) torque-generating devices. When the rotary electric machine is energized by a direct current (DC) voltage from a multi-cell battery pack or other DC power supply, a power inverter produces a desired polyphase AC output voltage. For example, a three-phase AC power inverter uses three separate phase inverters each having semiconductor switching components, e.g., IGBTs, MOSFETs, or thyristors. The on/off states of the switching components for a given electrical phase are controlled to produce the desired AC output voltage. The AC output voltage is thereafter supplied to a corresponding phase winding of the rotary electric machine.

Pulse-width modulation (PWM) is a technique for adjusting a level of power delivered to a connected electrical load. PWM involves the digital encoding of an analog reference signal corresponding to the desired AC output voltage. In a PWM process, a modulator adjusts the pulse widths of a series of digital pulses in proportion to the magnitude of the analog reference signal. As a result, the AC output voltage of the power inverter varies between 0% and 100% of the available DC input voltage by adjusting the duty cycle of the DC power supply.

A modulation index, which is defined as a normalized fundamental reference voltage, can be used to characterize performance of the PWM. The modulation index is the ratio of the peak fundamental phase voltage (Vr) to the maximum available voltage. In a three-phase system, three important modulation regions can be defined in terms of their modulation index. The regions are defined as a linear modulation region, a first overmodulation region, and a second overmodulation region.

As used herein, "modulation index (MI)," which can be defined as a normalized fundamental reference voltage, is the ratio of the peak fundamental phase voltage (Vr) to the maximum available voltage. The MI can be used to characterize performance of PWM.

The range of modulation index is from 0 to approximately 0.9 or 0% to approximately 90% for linear modulation control. Modulation index values greater than approximately 90% are associated with overmodulation. A modulation index value indicates six-step operation. As used herein, the term "six-step PWM" refers to a switching control mode in which the power inverter cycles through six non-zero voltage states for each electrical fundamental cycle of the rotary electric machine. The voltage angles of the six non-zero voltage states are spaced apart from each other by 60 degrees of phase shift. A linear relationship exists between the input to the power inverter and the output voltage when 0<MI<1, with "MI" representing the modulation index. Also as used herein, "six-step" is a mode that occurs when the modulation index equals 1. A transition between over-modulation mode and six-step PWM mode, particularly during higher rotational speeds of the rotary electric machine, may result in undesirable current ripple and/or potential over-current faults.

Referring to FIG. 1, the electric drive system 10 includes controller C 40 having a processor P and memory M that have been adapted to regulate the operation of various onboard systems and components in the vehicle 14. The controller C 40 is communicatively connected with the power inverter 22 to control the rotary electric machine 24 to control bi-directional transfer of energy between the rechargeable energy storage unit 20 and the rotary electric machine 24 in either a motoring mode and a regenerative mode. The rotary electric machine 24 may operate using a three-phase AC current. In such an instance, the power inverter 22 is governed by the controller C 40 to convert the DC voltage (provided by the rechargeable energy storage unit 20) to a three-phase AC voltage for use by the rotary electric machine 24 to generate torque when operating in the motoring mode. In the regenerative mode, the power inverter 22 converts AC power from the rotary electric machine 24 to DC power compatible with and storable on the rechargeable energy storage unit 20. It is understood that the electric drive system 10 may include additional components not shown.

The various components of the electric drive system 10 may be in communication with the controller C 40 (and each other) via a wireless network 30, which may be a short-range network or a long-range network. Additionally, the various components of the electric drive system 10 may include physical wired connections. The wireless network 30 may be a communication BUS, which may be in the form of a serial Controller Area Network (CAN-BUS). The wireless network 30 may incorporate a Bluetooth™ connection, a Wireless Local Area Network (LAN) which links multiple devices using a wireless distribution method, a Wireless Metropolitan Area Network (MAN) which connects several wireless LANs or a Wireless Wide Area Network (WAN). Other types of connections may be employed.

The controller C 40 is programmed to receive a torque command in response to an operator input (e.g., through an accelerator pedal or brake pedal) or an automatically fed input condition monitored by the controller C 40. Upon receipt of the torque command, the controller C 40 is programmed to transmit a command signal to the power inverter 22 to regulate a transfer of electrical power between the rechargeable energy storage unit 20 and the rotary electric machine 24. One technique employed to obtain a variable frequency, variable voltage or variable power from a power inverter 22 operating from a fixed voltage DC power source, such as the rechargeable energy storage unit 20 is the pulse width modulation ("PWM" hereinafter) technique. The switching frequency of the PWM signal determines how fast the PWM completes a cycle, and therefore how fast it switches between high and low states. In other words, the PWM switching frequency corresponds to the rate at which the DC voltage is switched on and off during the PWM process in a switching power supply. There are various PWM techniques which may be implemented, such as for example, sinusoidal PWM (SPWM), space vector PWM (SVPWM), zero-vector modulation (ZVM)

and discontinuous PWM (DPWM). These techniques differ in terms of their voltage linearity range, ripple voltage/current, switching losses, and high frequency common mode voltage or current properties.

Figure 2:
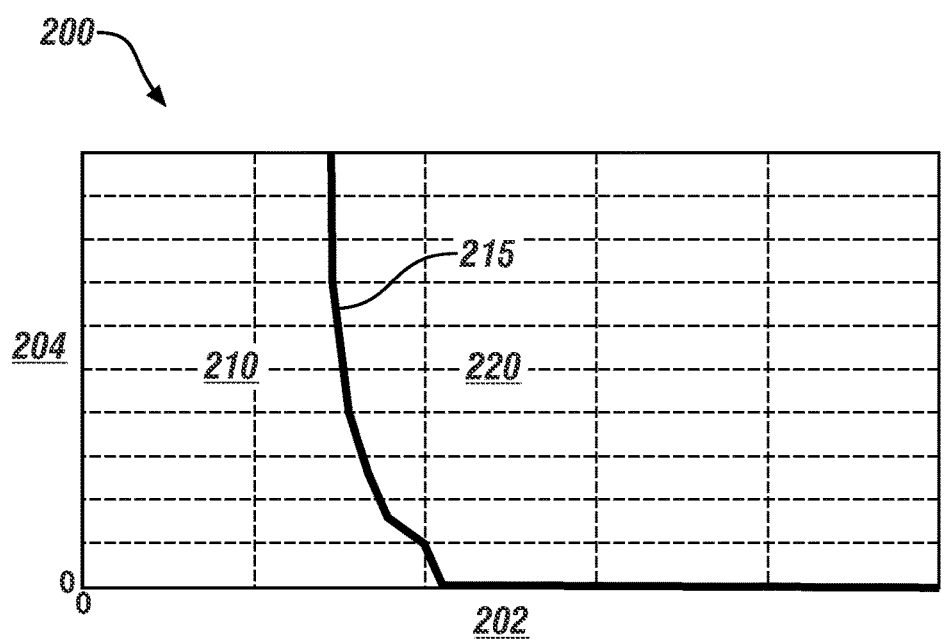
FIG. 2 graphically illustrates a known calibration associated with pulsewidth-modulated (PWM) control of a rotary electric machine in one of a modulation index (MI) mode or a six-step mode in terms of speed and torque, in accordance with the disclosure.

FIG. 2 graphically illustrates a known calibration 200 associated with PWM control of an electric machine in one of a modulation index (MI) mode 210 or a six-step mode 220, shown in terms of speed 202 (on the horizontal axis) and torque 204 (on the vertical axis). A single threshold 215 is indicated, and can be implemented to control operation of an electric machine to manage transitions between the MI mode 210 and the overmodulation, i.e., a six-step mode 220. Issues that arise with motor control that employs the single threshold 215 include undesirable motor vibration, reduced motor efficiency, reduction in maximum motor torque, and reduced controllability at high motor speeds.

Figure 3:
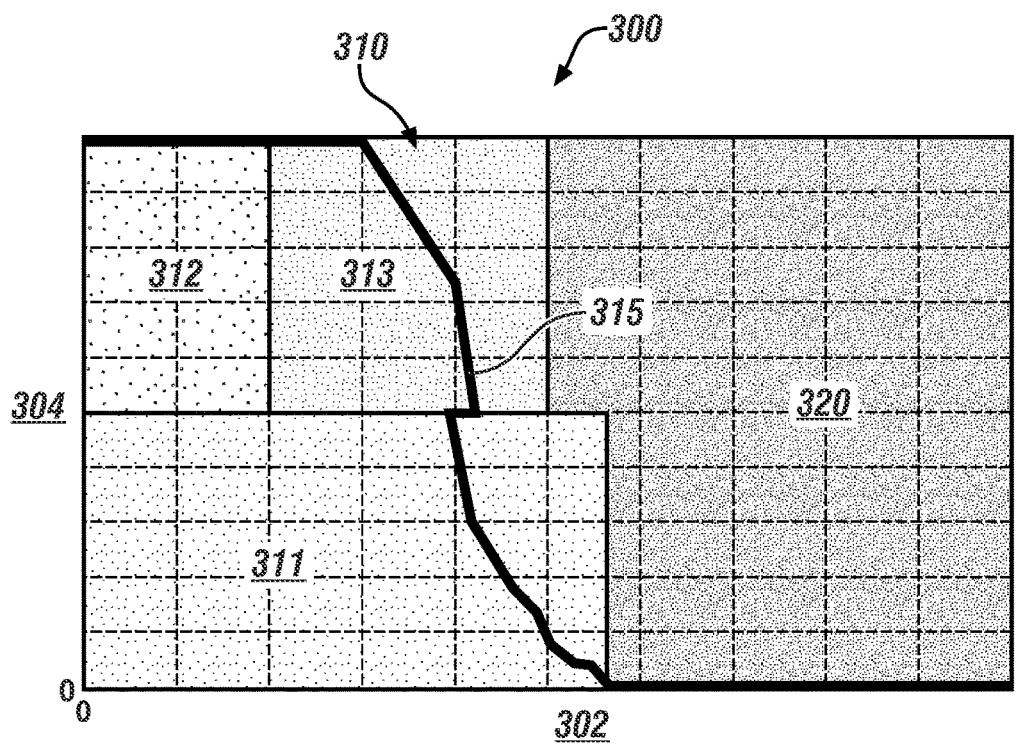
FIG. 3 graphically illustrates a novel motor control calibration for pulsewidth-modulated (PWM) control of a rotary electric machine in one of a modulation index (MI) mode or a six-step mode in terms of speed and torque, in accordance with the disclosure.

FIG. 3 graphically illustrates elements of an embodiment of a novel motor control calibration 300 for controlling operation of an embodiment of the rotary electric machine 24 that is described with reference to FIG. 1 when it is operating in a motoring mode to generate torque. The motor control calibration 300 is used to control operation of the power inverter 22 in one of a modulation index (MI) mode 310 or a six-step mode 320 to control the rotary electric machine 24. The motor control calibration 300 represents operation in the motoring mode, and is shown in terms of speed 302 on the horizontal axis (ranging from zero speed to a maximum speed) and torque 304 on the vertical axis (ranging from zero torque to a maximum torque). The motor control calibration 300 represents operation of the rotary electric machine 24 with the DC bus voltage 110 at a nominal or expected bus voltage level. A threshold line 315 is illustrated, and represents a dividing line between operation in the MI mode 310 and the six-step mode 320. It is appreciated that there is an analogous motor control calibration for controlling operation of an embodiment of the rotary electric machine 24 that is described with reference to FIG. 1 when it is operating in a regenerative mode.

The MI mode 310 includes a low-torque region 311 having an associated MI of 99.5% in one embodiment, a low-speed, high-torque region 312 having an associated MI of 93% in one embodiment, and a high-torque, mid-range speed region 313 having an associated MI of 97% in one embodiment. At areas of operation that are greater than the threshold line 315, indicated by region 310, operation of the rotary electric machine 24 is commanded in the six-step mode, with the MI command being greater than or equal to 100%. The switching frequency and MI command are optimized to balance the operation of the system to reduce overall losses and increase efficiency. This can include reducing the motor iron loss and increasing switching losses under certain speed/torque operating conditions because motor iron losses have a greater effect on the system efficiency than inverter switching losses. Furthermore, the threshold line 315 and the calibration values for the switching mode, the switching frequency, and the commanded MI are selected to maximize motor efficiency, minimize inverter switching loss and motor iron loss, and minimize vibration and other noise-vibration-harshness (NVH) states. The calibration values may be predetermined during motor development for a representative embodiment of the rotary electric machine 24 and power inverter 22 of the electric drive system 10 for the vehicle 14. Operating with an MI of 99.5% can be more efficient than the six-step operation, but at very high speed operation, the six-step operation will become more efficient than other MI operation. The low torque range across all speeds have a significant impact on range of an EV. Additional operation in six-step mode will have the worst NVH performance compared to those MI examples. Furthermore, it is appreciated that the MI values of 99.5%, 97%, and 93% are representative numbers and may vary in practice.

The novel motor control calibration 300 of FIG. 3 can be reduced to practice as a lookup table (LUT1) that is stored in memory device M of the controller C 40, and be interpolated based upon inputs of speed N and torque T during operation of the inverter 22 and electric machine 24. Although not shown, LUT1 representing the motor control calibration 300 of FIG. 3 includes operation in the motoring mode and also in the regenerative mode.

Figure 4:
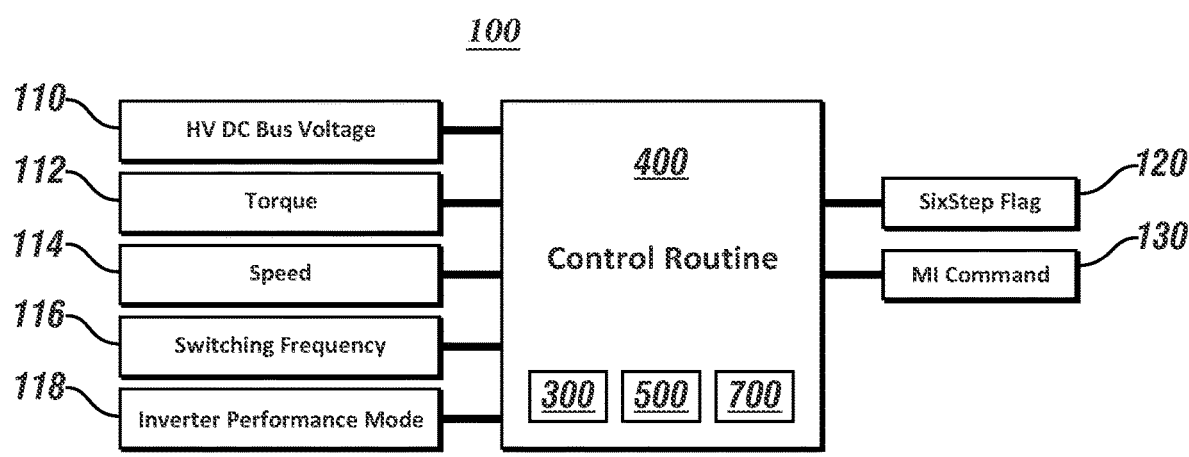
FIG. 4 schematically illustrates a process for controlling an electric drive system to operate a power inverter in one of a non-six-step switching mode, e.g., MI mode, or a six-step switching mode while operating the rotary electric machine in one of a motoring mode or a regenerative mode, in accordance with the disclosure.

FIG. 4 schematically illustrates a process 100 for controlling an embodiment of the electric drive system 10 described with reference to FIG. 1 to control the power inverter 22 to operate in one of a non-six-step switching mode, e.g., MI mode, or a six-step switching mode while operating the rotary electric machine 24 in one of a motoring mode or a regenerative mode, employing the motor control calibration 300 of FIG. 3. The process 100 may be stored and recorded as executable instructions in a tangible, non-transitory memory device that is part of the memory M of the controller C 40 of FIG. 1.

Monitored input parameters including DC power bus voltage 110, motor torque 112, motor speed 114, inverter switching frequency (PWM switching frequency) 116 and inverter performance mode 118, i.e., one of a motoring mode or a regenerative mode. The aforementioned input parameters are input to a control routine 400, which determines a modulation index (MI) command 130 and a six-step active flag 120 based thereon. The MI command 130 and the six-step active flag 120 are employed to control the power inverter 22 to operate the rotary electric machine 24 in one of the motoring mode or the regenerative mode.

The control routine 400 includes the motor control calibration 300 which has been reduced to practice as LUT1 representing the motor control calibration 300 of FIG. 3 for controlling operation of an embodiment of the rotary electric machine 24 that is described with reference to FIG. 1.

The control routine 400 also includes a second routine 500, which is described with reference to FIG. 5, and an interpolation routine 700, which is described with reference to FIG. 7.

Figure 5:
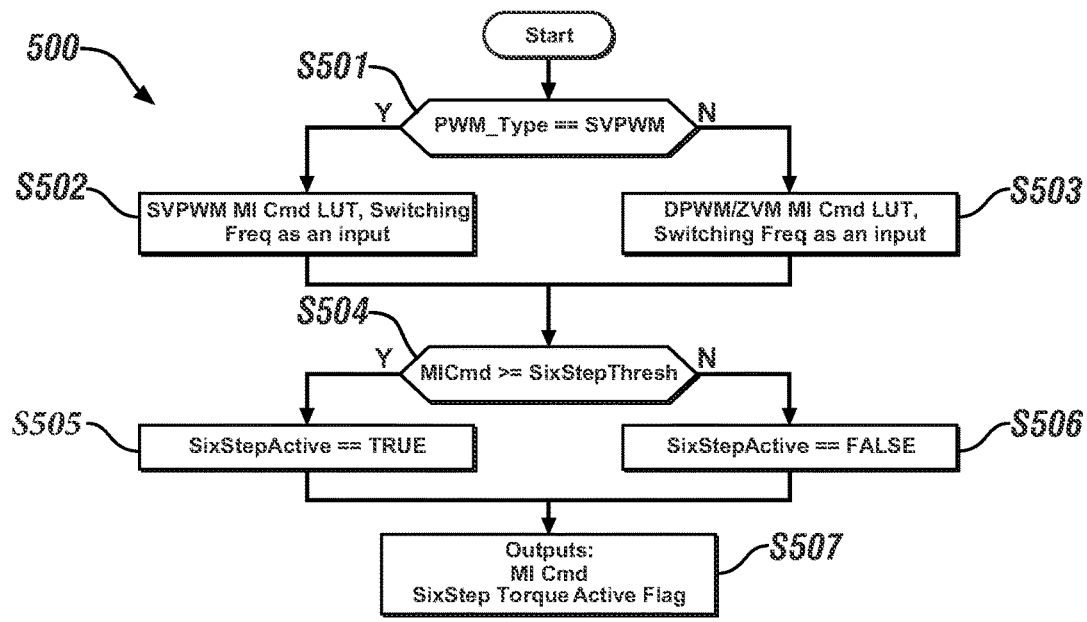
FIG. 5 schematically illustrates a routine to determine a status for a six-step active flag based upon DC bus voltage, motor torque, motor speed, inverter switching frequency and inverter performance mode, in accordance with the disclosure.

FIG. 5 schematically illustrates routine 500, with continued reference to the motor control calibration 300 of FIG. 3 to determine a status for the six-step active flag 120 based upon the DC bus voltage 110, motor torque 112, motor speed 114, inverter switching frequency (PWM switching frequency) 116 and inverter performance mode 118. Initially it is determined whether the power inverter 22 is presently operating in the non-six-step switching mode using SVPWM or other type of PWM mode (S501).

When the power inverter 22 is operating in SVPWM (Y), an MI command is determined based upon the PWM switching frequency 116 for the motor torque 112 and the motor speed 114, employing an embodiment of the LUT1 representing the motor control calibration 300 of FIG. 3 (S502).

When the power inverter 22 is operating with a PWM type other that SVPWM (N), an MI command is determined based upon the PWM switching frequency 116 for the motor torque 112 and the motor speed 114, again employing LUT1 representing the motor control calibration 300 of FIG. 3 (S503).

The MI command that is determined based upon either S502 or S503 is evaluated to determine if it is greater than a threshold associated with six-step operation (S504). An example of the threshold associated with six-step operation is threshold line 315 that is illustrated in the motor control calibration 300 of FIG. 3, which represents a dividing line between operation in the MI mode 310 and the six-step mode 320. The threshold line 315 has a hysteresis band to avoid toggling in and out of the six-step mode due to speed ripple and other effects.

When the MI command is equal to or greater than the threshold associated with six-step operation, the six-step active flag is set to TRUE (S505).

When the MI command is less than the threshold associated with six-step operation (S506), the six-step-active flag is set to FALSE (S506).

The control routine 500 generates outputs in the form of the MI command and the status of the six-step-active flag (S507), which are communicated to the power inverter 22 for controlling the rotary electric machine 24.

Figure 7:
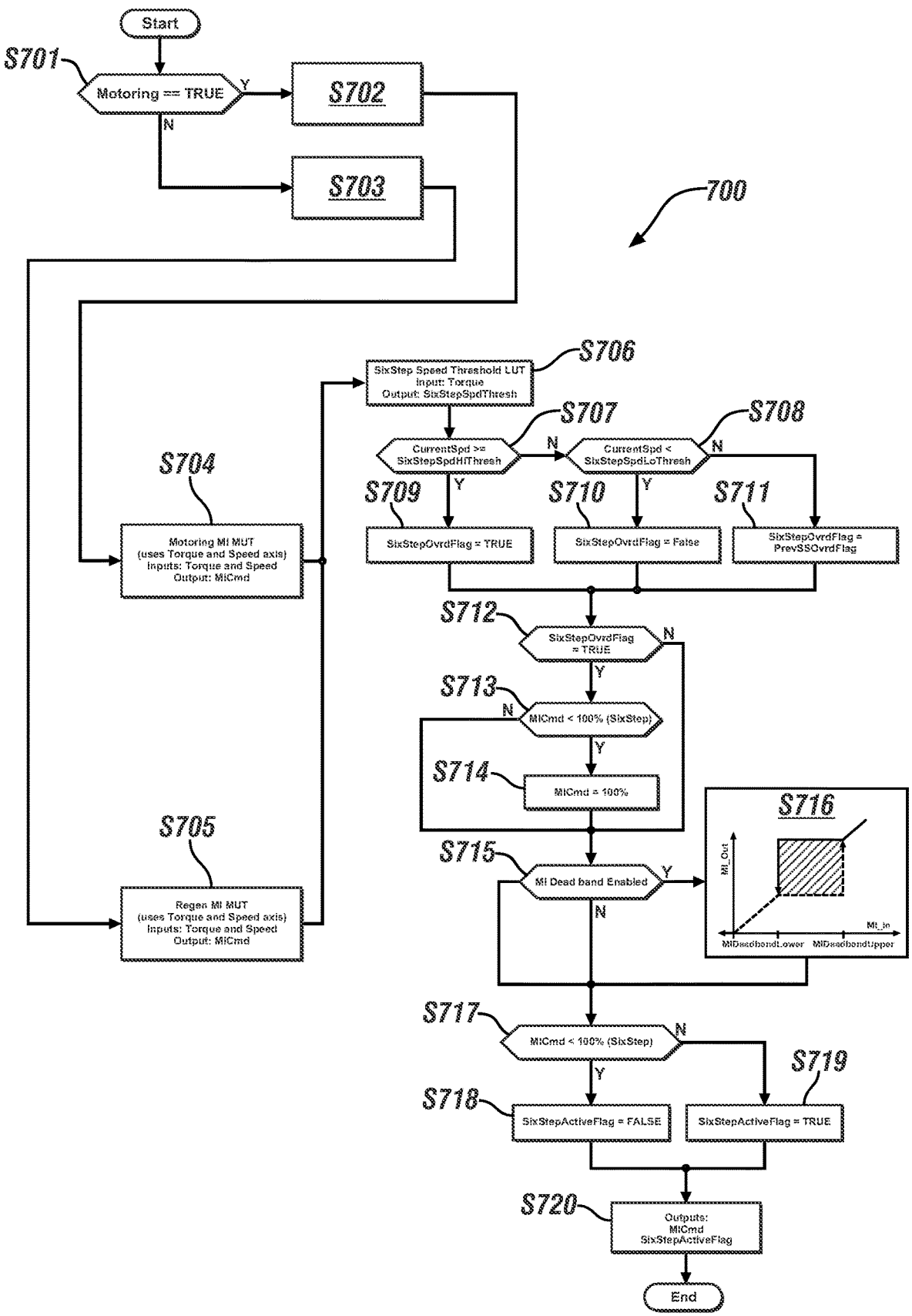
FIG. 7 schematically illustrates an interpolation routine to determine a modulation index (MI) command based upon DC bus voltage, motor torque, motor speed, inverter switching frequency, and inverter performance mode, in accordance with the disclosure.

FIG. 7 schematically illustrates interpolation routine 700, which is an element of the control routine 400 of FIG. 4 to determine the modulation index (MI) command 130 based upon the DC bus voltage 110, motor torque 112, motor speed 114, inverter switching frequency (PWM switching frequency) 116 and inverter performance mode 118, i.e., one of the motoring mode or the regenerative mode. The MI command 130 is determined based upon virtual two LUTs, one for motoring and one for regenerative operation, which are determined based upon the inverter performance. Inputs to the two LUTs are speed and torque, and the axes are linearly interpolated based upon the DC bus voltage.

Initially, the routine 700 determines whether the rotary electric machine 24 is operating in the motoring mode or the regenerative mode (S701).

When operating in the motoring mode (S702), the routine 700 determines the actual DC bus voltage 110, and generates a virtual motoring LUT having torque axis values and speed axis values that are determined based upon a linear interpolation between the actual DC bus voltage 110 and a nominal DC bus voltage for LUT1 for the motor control calibration 300. The nominal DC bus voltage represents the DC bus voltage at which the LUT1 for the motor control calibration 300 described with reference to FIG. 3 was created. An example of the virtual motoring LUT for a situation in which the actual DC bus voltage 110 is less than the nominal DC bus voltage is illustrated with reference to the second motoring LUT 622 in FIG. 6. In one embodiment, the actual DC bus voltage 110 is less than the nominal DC bus voltage by 50V for the second motoring LUT 622. Another example of the virtual motoring LUT for a situation in which the actual DC bus voltage 110 is near the nominal DC bus voltage is illustrated with reference to the first motoring LUT 612 in FIG. 6.

When operating in the regenerative mode (S703), the routine 700 determines the actual DC bus voltage 110, and generates a virtual regenerative LUT having torque axis values and speed axis values that are determined based upon a linear interpolation between the actual DC bus voltage 110 and a nominal DC bus voltage for LUT1 for the motor control calibration 300. An example of the virtual regenerative LUT for a situation in which the actual DC bus voltage 110 is lower than the nominal DC bus voltage is illustrated with reference to the second regenerative LUT 624 in FIG. 6. Another example of the virtual regenerative LUT for a situation in which the actual DC bus voltage 110 is near the nominal DC bus voltage is illustrated with reference to first regenerative LUT 614 in FIG. 6.

When operating in the motoring mode, the routine 700 interrogates the motoring LUT generated by S702 to determine the MI command based upon the motor torque 112 and motor speed 114 (S704).

When operating in the regenerative mode, the routine 700 interrogates the virtual motoring LUT generated by S703 to determine the MI command based upon the motor torque 112 and motor speed 114 (S705).

The MI command determined by either S704 or S705 is evaluated in context of the motor control calibration 300 of FIG. 3 that is reduced to practice as LUT1.

The motor torque 112 is input to LUT1 to determine a six-step speed threshold for the MI command that is determined by either S704 or S705 (S706). This is done to introduce hysteresis into the control system to minimize toggling between six-step operation and non-six-step operation. The six-step speed threshold is defined by the threshold line 315 that is illustrated with reference to FIG. 3, and represents a dividing line between operation in the MI mode 310 and the six-step mode 320.

Referring again to FIG. 7, the motor speed 114 is compared to a high speed threshold (S707) and a low speed threshold (S708). When the motor speed 114 is greater than the high speed threshold, a six-step override flag is activated or set to TRUE (S709). When the motor speed 114 is less than the low speed threshold, the six-step override flag is deactivated or set to FALSE (S710). Otherwise the six-step override flag is unchanged from a previous iteration (S711).

The six-step override flag is evaluated (S712). When the six-step override flag is defined as TRUE, the MI command is evaluated (S713) and is set to 100% when the MI command is less than 100% (S714), thus enabling operation in the six-step mode.

Figure 8:
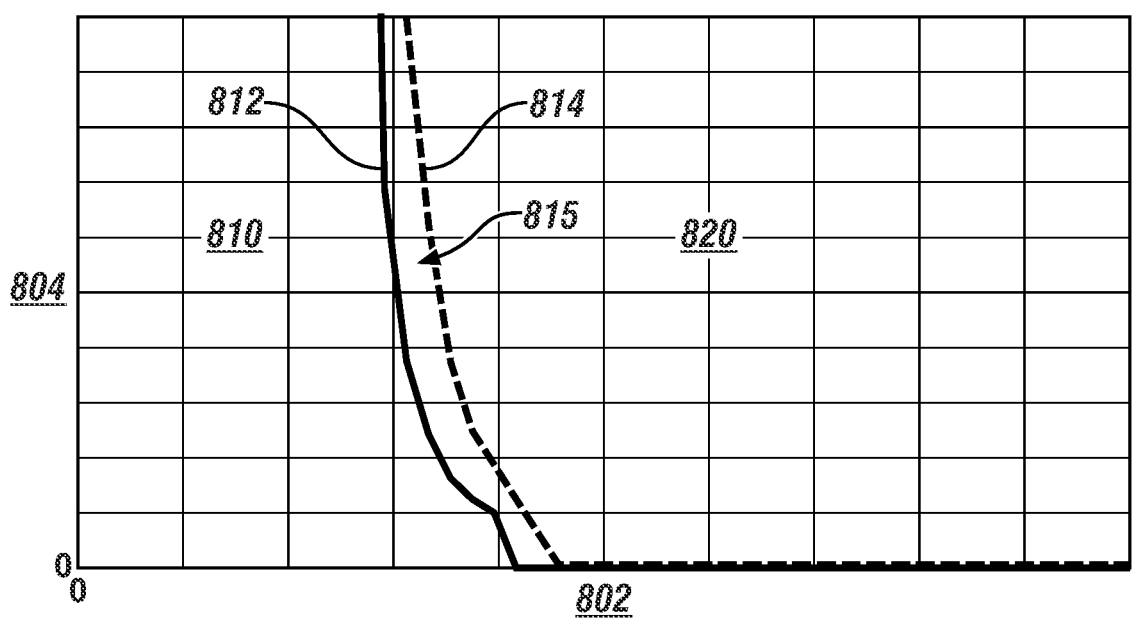
FIG. 8 graphically illustrates a novel motor control calibration for pulsewidth-modulated (PWM) control of a rotary electric machine in one of a modulation index (MI) mode or a six-step mode in terms of speed and torque, in accordance with the disclosure.

When a MI deadband operation is enabled (S715), upper and lower deadband limits are implemented to provide hysteresis in the system and avoid unnecessary transitions and toggling when operating with the MI command at or near the transition point (S716). FIG. 8 graphically illustrates upper and lower deadband limits 812, 814, respectively, for implementing hysteresis 815 into the system and avoid unnecessary transitions and toggling when operating with the MI command at or near the transition point, with region 810 indicating the operation in the non-six-step mode and region 820 indicating operation in the six-step mode, wherein speed 802 is indicated on the horizontal axis and torque 804 is indicated on the vertical axis.

The MI command is evaluated to determine if it is less than 100% (S717), and if so, a six-step active flag is deactivated or FALSE (S718). If it is greater than or equal to 100%, a six-step active flag is activated or TRUE (S719).

The routine 700 generates outputs that include the MI command and the status of the six-step active flag, i.e., TRUE or FALSE (S720), which are employed by routine 400 in controlling the rotary electric machine 24, and the iteration of the routine 700 ends.

Figure 6:
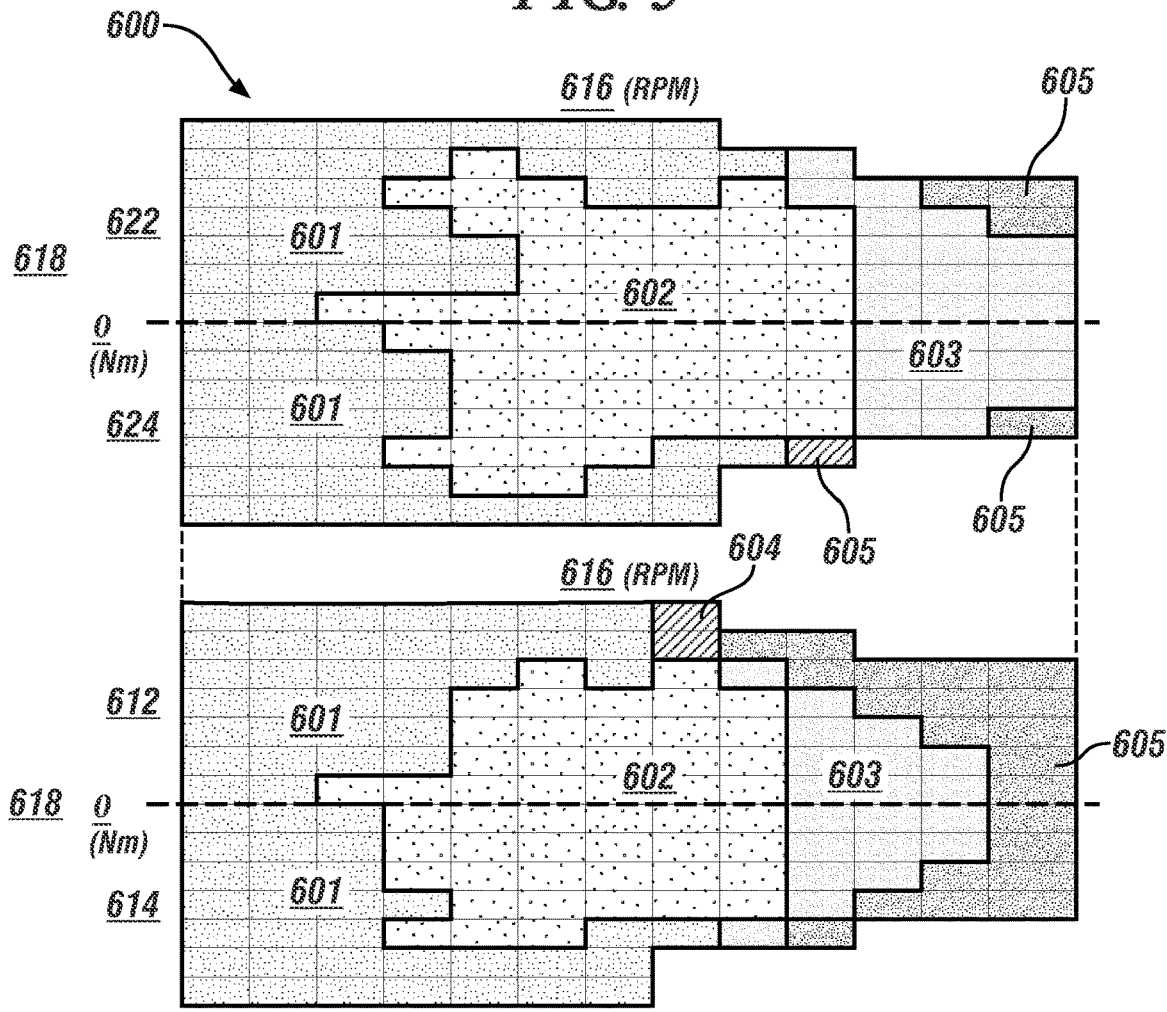
FIG. 6 schematically illustrates a plurality of look-up tables (LUTs) that are generated by the interpolation routine described with reference to FIG. 7, in accordance with the disclosure.

FIG. 6 schematically illustrates a plurality of LUTs 600 that are generated by the routine 700, including a first motoring LUT 612, in which the actual DC bus voltage 110 is equal to the nominal DC bus voltage, a second motoring LUT 622, in which the actual DC bus voltage is less than the nominal DC bus voltage, a first regenerative LUT 614, in which the actual DC bus voltage 110 is equal to the nominal DC bus voltage, a second regenerative LUT 624, in which the actual DC bus voltage is less than the nominal DC bus voltage.

Each of the plurality of LUTs 612, 622, 614, 624 are subdivided into a plurality of speed regions 616 and torque regions 618, creating a table of speed/load bins, each of which is populated with a switching frequency and an MI command. Each of the speed/load bins is populated with calibration values for the MI command or switching mode, and the switching frequency that maximizes motor efficiency, minimizes inverter switching loss and motor iron loss, and minimizes vibration and other noise-vibration-harshness (NVH) states. The calibration values may be predetermined during motor development for a representative embodiment of the rotary electric machine 24 and power inverter 22 of the electric drive system 10 for the vehicle 14.

The contents of the speed/load bins may be categorized, including first bins 601 that operate in the non-six-step mode with a low MI command, e.g., 93% and at a low switching frequency, e.g., 10 kHz; second bins 602 that operate in the non-six-step mode with a high MI command, e.g., 99% and at a high switching frequency, e.g., 20 kHz; third bins 603 that operate in the non-six-step mode with an ultra-high MI command, e.g., 99.5% and at a high switching frequency, e.g., 20 kHz; fourth bins 604 that operate in the non-six-step mode with an ultra-high MI command, e.g., 99.5% and at a low switching frequency, e.g., 10 kHz; and fifth bins 605 that operate in the six-step mode with MI command that is greater than 100% and at a high switching frequency, e.g., 20 kHz.

The concepts provide a system and method for minimizing inverter switching losses and NVH when operating a polyphase AC motor in a six-step mode or a non-six step mode. The concepts provide a control system that manages performance trade-offs between undesired vibration and motor efficiency, and optimizes operation to minimize NVH, maximize efficiency, maximize torque output, and improve high-speed controllability, including selectively operating in one of a six-step mode or a non-six step mode. The concepts further provide a system and method for improved efficiency at high-speed operation. The concepts further provide a system and method to maximize efficiency and minimize NVH across a range of speed/torque operating points and bus voltage levels, including at high-speed operation employing a LUT.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The terms "calibration", "calibrated", and related terms refer to a result or a process that correlates a desired parameter and one or multiple perceived or observed parameters for a device or a system. A calibration as described herein may be reduced to a storable parametric table, a plurality of executable equations or another suitable form that may be employed as part of a measurement or control routine.

The term "parameter" refers to a measurable quantity that represents a physical property of a device or other element that is discernible using one or more sensors and/or a physical model. A parameter can have a discrete value, e.g., either "1" or "0", or can be infinitely variable in value.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction set that implements the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. An electric drive system comprising:
a rechargeable energy storage unit connected to a power inverter via an electric power bus;
an electric machine operatively connected to the power inverter; and
a controller in communication with the power inverter;

wherein a transfer of electrical power between the rechargeable energy storage unit and the rotary electric machine is governed by a pulse width modulation (PWM) switching mode, the PWM switching mode including a non-six-step switching mode and a six-step switching mode;

wherein the controller has a processor and tangible, non-transitory memory on which instructions are recorded, the instructions being executable by the processor to:

determine a rotational speed, a torque command, a torque direction, a bus voltage, and a hysteresis band;

determine a modulation index command in response to the rotational speed, the torque command, the torque direction, the bus voltage, and the hysteresis band; and command operation of the rotary electric machine in one of the non-six-step switching mode or the six-step switching mode employing the modulation index command.

2. The electric drive system of claim 1, wherein the instructions being executable to determine the modulation index command in response to the rotational speed, the torque command, the torque direction, and the bus voltage comprises the instructions being executable to:

determine a first calibration defining a first relation between the rotational speed, the torque command, and the modulation index command;

determine a second calibration based upon the first calibration and the bus voltage; and determine the modulation index command for the rotational speed and the torque command employing the second calibration.

3. The electric drive system of claim 2, wherein the first calibration comprises a look-up table residing in the tangible, non-transitory memory and accessible to the controller.

4. The electric drive system of claim 2, wherein the second calibration comprises a virtual look-up table that is generated by the controller, and is captured in a transitory memory device of the controller.

5. The electric drive system of claim 1, further comprising the instructions being executable to transition the operation of the rotary electric machine to the other of the non-six-step switching mode or the six-step switching mode based upon the rotational speed, the torque command, the torque direction, the bus voltage, and the hysteresis band.

6. The electric drive system of claim 5, further comprising the instructions being executable to command operation of the rotary electric machine in the other of the non-six-step switching mode or the six-step switching mode employing the modulation index command.

7. The electric drive system of claim 1, wherein the instructions being executable to determine the modulation index command in response to the rotational speed, the torque command, the torque direction, and the bus voltage comprises the instructions being executable to determine a modulation index command that is responsive to the rotational speed and the torque command for the torque direction based upon the bus voltage and minimizes factors related to vibrational harshness caused by rotation of the rotary electric machine.

8. The electric drive system of claim 1, wherein the instructions being executable to determine the modulation index command in response to the rotational speed, the torque command, the torque direction, and the bus voltage comprises the instructions being executable to determine a modulation index command that is responsive to the rotational speed and the torque command for the torque direction based upon the bus voltage and maximizes factors related to efficiency.

9. The electric drive system of claim 1, wherein the instructions being executable to determine the modulation index command in response to the rotational speed, the torque command, the torque direction, and the bus voltage comprises the instructions being executable to select a modulation index command of 99.5% during operation in the non-six-step switching mode and in a low torque region.

10. The electric drive system of claim 1, wherein the instructions being executable to determine the modulation index command in response to the rotational speed, the torque command, the torque direction, and the bus voltage comprises the instructions being executable to select a modulation index command of 97% during operation in the non-six-step switching mode and in a mid-torque region, and select a modulation index command of 93% during operation in the non-six-step switching mode and in a low-speed, high-torque region.

11. The electric drive system of claim 1, wherein the instructions being executable to determine the modulation index command in response to the rotational speed, the torque command, the torque direction, and the bus voltage comprises the instructions being executable to select a modulation index command greater than 100% during operation in the six-step switching mode.

12. The electric drive system of claim 1, wherein the torque direction comprises one of a motoring torque or a regenerative torque; and wherein a first modulation index command determined for the torque direction being the motoring torque differs from a second modulation index command determined for the torque direction being the regenerative torque.

13. A method for controlling an electric drive system include a rechargeable energy storage unit, a power inverter, and an electric machine, the method comprising:

determining a rotational speed, a torque command, a torque direction, a bus voltage, and a hysteresis band;

determining a modulation index command in response to the rotational speed, the torque command, the torque direction, the bus voltage, and the hysteresis band; and commanding operation of the rotary electric machine in one of a non-six-step switching mode or a six-step switching mode employing the modulation index command.

14. The method of claim 13, wherein determining the modulation index command in response to the rotational speed, the torque command, the torque direction, and the bus voltage comprises:

determining a first calibration defining a first relation between the rotational speed, the torque command, and the modulation index command;

determining a second calibration based upon the first calibration and the bus voltage; and determining the modulation index command for the rotational speed and the torque command employing the second calibration.

15. The method of claim 14, wherein the first calibration comprises a look-up table residing in the tangible, non-transitory memory and accessible to the controller.

16. The method of claim 14, wherein the second calibration comprises a virtual look-up table that is generated by the controller, and is captured in a transitory memory device of the controller.

17. The method of claim 13, further comprising transitioning the operation of the rotary electric machine to the other of the non-six-step switching mode or the six-step switching mode based upon the rotational speed, the torque command, the torque direction, the bus voltage, and the hysteresis band.

18. The method of claim 13, further comprising commanding operation of the rotary electric machine in the other of the non-six-step switching mode or the six-step switching mode employing the modulation index command.

19. The method of claim 13, wherein determining the modulation index command in response to the rotational speed, the torque command, the torque direction, and the bus voltage comprises determining a modulation index command that is responsive to the rotational speed and the torque command for the torque direction based upon the bus voltage to minimize factors related to vibrational harshness caused by rotation of the rotary electric machine.

20. The method of claim 13, wherein determining the modulation index command in response to the rotational speed, the torque command, the torque direction, and the bus voltage comprises determining a modulation index command that is responsive to the rotational speed and the torque command for the torque direction based upon the bus voltage to maximize factors related to efficiency.

* * * * *